United States Patent [19]

Brechner

[11] Patent Number: 5,825,998

[45] Date of Patent: Oct. 20, 1998

[54] METHOD FOR CONTROLLING THE LEVEL OF DETAIL DISPLAYED IN A COMPUTER GENERATED SCREEN DISPLAY OF A COMPLEX STRUCTURE

[75] Inventor: Eric L. Brechner, Redmond, Wash.

[73] Assignee: The Boeing Company, Seattle, Wash.

[21] Appl. No.: 677,297

[22] Filed: Jul. 9, 1996

Related U.S. Application Data

[63] Continuation of Ser. No. 329,355, Oct. 26, 1994, abandoned.

[51] Int. Cl.[6] .................................................. G06T 9/40
[52] U.S. Cl. ......................... 395/128; 395/120; 395/131
[58] Field of Search .................................. 395/123, 124, 395/128–132, 120

[56] References Cited

U.S. PATENT DOCUMENTS

| | | | |
|---|---|---|---|
| 4,631,690 | 12/1986 | Corthout et al. | 395/120 |
| 4,727,365 | 2/1988 | Bunker et al. | 395/139 |
| 4,862,392 | 8/1989 | Steiner | 395/127 |

(List continued on next page.)

OTHER PUBLICATIONS

Chen et al, "Modeling Part Data for Geometric Reasoning Using Data Abstraction and Object–Oriented Techniques" Systems, Man, and Cybernetics International Conf. Jul. 1991.

Heckbert et al, "Multiresolution Modeling for Fast Rendering" Computer Science Dept., Carnegie Mellon Univ., Computer Interface '94.

Funkhouser et al, "Adaptive Display Algorithm for Interactive Frame Rates During Visulaization of Complex Virtual Environments" Computer Graphics Proceedings, Annual Conf. Series, 1993.

Kay et al, "Ray Tracing Complex Scenes" Proceedings of SIGGRAPH 86, vol. 20, n4, pp. 269–278, 1986.

Sureshchandran, Algorithms and Architectures for Real Time Image Compression Using a Feature Visibility Criterion, IEEE Systems, Man, and Cybernetics 1993 Intl Conf. Proc., pp. 339–344, Oct. 17, 1993.

Foley et al., Computer Graphics: Principles and Practice, 1990, pp. 288–291, 311–315, 336, 337, 340, 341, 660–665, 705–712.

*Primary Examiner*—Anton W. Fetting
*Attorney, Agent, or Firm*—James P. Hamley

[57] ABSTRACT

A method for controlling the level of detail displayed in a computer generated screen display of a complex structure in which the structure is modeled as a root volume bounding all of the parts of the structure, with the individual parts comprising sub-objects bounded in sub-volumes. The method begins by selecting the root volume (202) and then enters the step of determining whether or not all sub objects within the selected volume are turned off (204). If they are, the entire display is culled. If they are not, the system then computes the screen coordinates of the selected volume (208). The method proceeds to the step of determining whether or not the selected volume is on the screen or off. If it is off the screen, the entire volume is culled. If it is on screen, however, a determination is made as to whether or not all sub-objects are turned on (214). If all sub-objects are turned on, the number of screen pixels for the selected volume is computed (216). This screen size is compared to a user defined threshold (218) and if its smaller than the threshold, the object is drawn as a bounding volume (220). If the selected object is larger than the threshold, a determination is made (230) as to whether or not the object includes sub-volumes. If it does not, the detailed object is drawn (232). If it does include sub-volumes, the system passes each sub-volume (240) back to the step of determining whether or not all sub-objects are turned off (204) to thereby determine for the entire root volume and all sub-volumes the appropriate level of detail to be displayed. The color for any given volume within a level of detail is determined by algebraic summation of the color of all sub-volumes within a parent volume weighted by the ratio of the sub-volume's volume to the parent's volume raised to the ⅔ power. This provides a crude inverse square fall off of intensity of the sub-volumes color to the parent's volume with pleasing results.

18 Claims, 9 Drawing Sheets

U.S. PATENT DOCUMENTS

| | | | |
|---|---|---|---|
| 4,901,252 | 2/1990 | Fitzgerald et al. | 395/121 |
| 4,912,659 | 3/1990 | Liang | 395/134 |
| 4,982,180 | 1/1991 | Seki et al. | 345/139 |
| 5,048,095 | 9/1991 | Bhanu et al. | 382/173 |
| 5,088,054 | 2/1992 | Paris, II | 395/121 |
| 5,231,695 | 7/1993 | Harrington | 395/134 |
| 5,537,519 | 7/1996 | Vossler et al. | 395/120 |

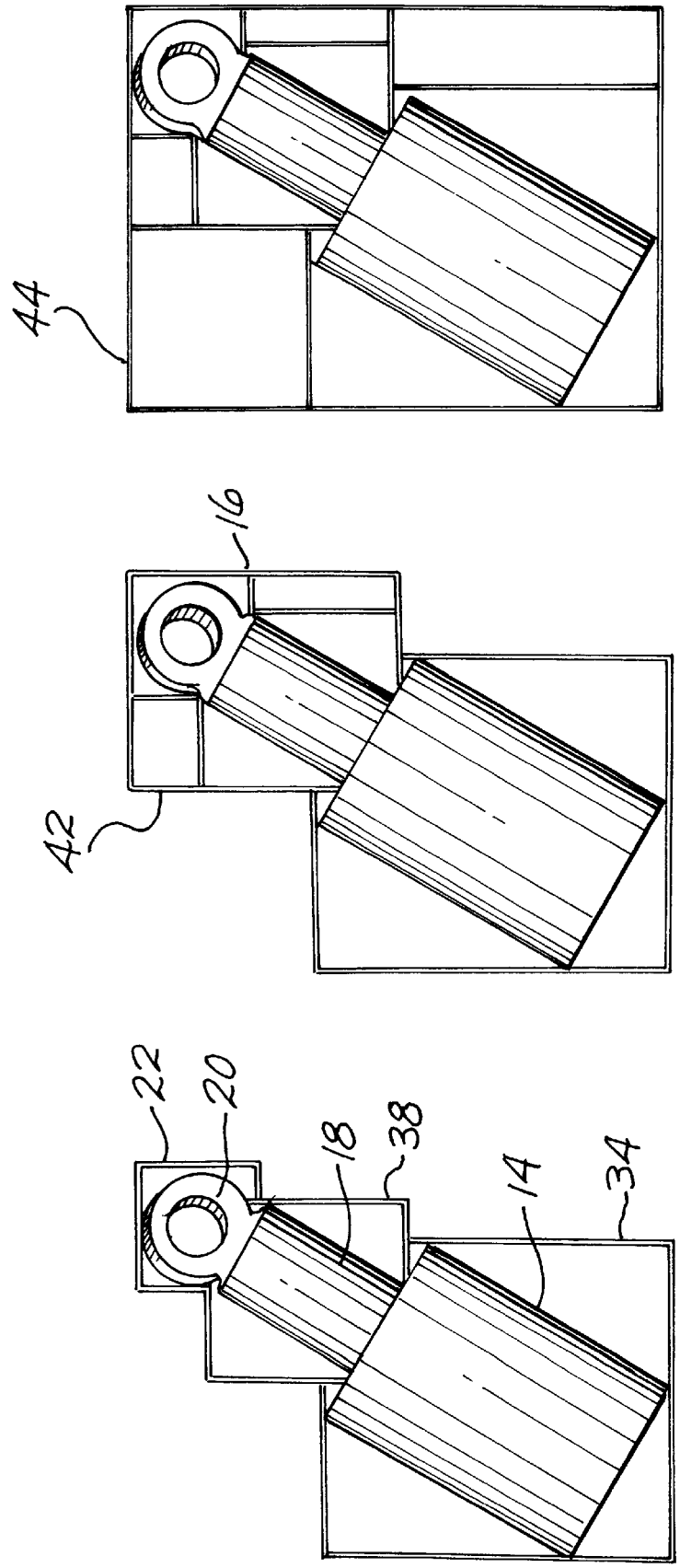

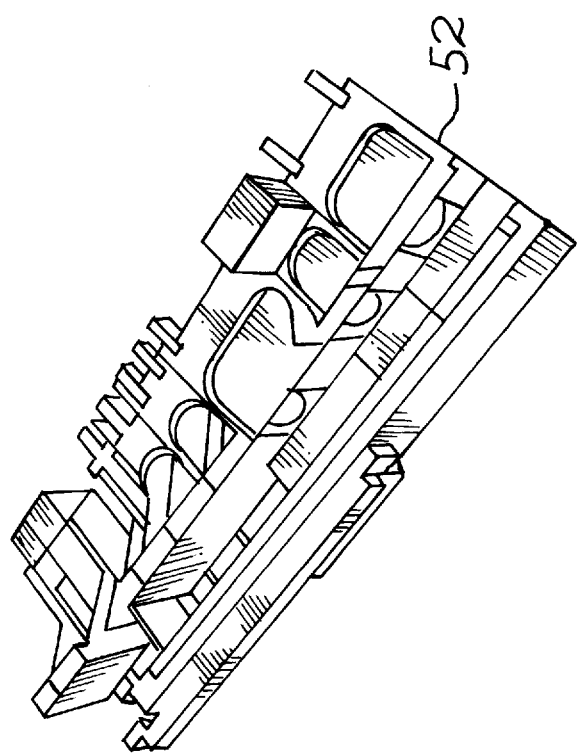

METHOD FOR CONTROLLING THE LEVEL OF DETAIL DISPLAYED IN A COMPUTER GENERATED SCREEN DISPLAY OF A COMPLEX STRUCTURE

This application is a continuation of prior application Ser. No. 08/329,355 filed Oct. 26, 1994, now abandoned.

BACKGROUND OF THE INVENTION

The present invention relates to a method for computer image modeling of a complex structure and, in particular, to a method for controlling level of detail displayed in a computer generated screen display of a complex structure. Also included is a method for determining the color of level of detail bounding volumes in a computer generated display.

Interactive computer generated displays provide for the visualization of realistic looking, three dimensional models. Such models, under user control, are useful for both design evaluation and training in virtual environments, as may be found, for example, in mechanical computerized design systems. Such computer visualization systems provide images of three-dimensional, complex structure on the screen of a computer workstation as seen from a simulated observer's viewpoint under interactive control by the user. If the computer generated display can be rendered smoothly and quickly enough, the user is provided an illusion of real-time exploration of a virtual environment under simulated observer movement through the structure.

A particular application for an interactive, computer generated visualization system of a is found in the modeling of highly complex structure, such as aircraft. Here, a system which allows the user interactive movement throughout the structure can aid in numerous aspects related to the ultimate success of the product. For example, an interactive display of a complex aircraft structure can identify interference and fit problems, provide the ability to "see" areas of the product normally hidden in a physical mock-up, design routing of ducts and wiring through crowded areas, facilitate the work of integrated product teams by providing a "live" model and reduce cycle time and cost of the production of illustrations and training media.

As computer graphic based systems have matured, so have the three-dimensional model data bases that its methods were meant to display. Because real world structure contains far more complexity than can reasonably be stored on computer storage media, the complexity of models developed has traditionally exceeded the capacity of the hardware required to display it. To deal with this problem, various methods have been developed to reduce the complexity of models while attempting to effect only minor changes on the perceived complexity to the eye. These methods may be divided into two categories: culling and detail elision.

Culling is the practice of not displaying objects that are invisible from the current viewing position. Such objects are considered "culled" from the scene. Objects may be culled either from being hidden by other objects or by being outside the current viewing frustum. While culling to the viewing frustum is often straightforward, culling occluded objects can be difficult, although numerous algorithms have been devised to solve this problem. The key to culling is having a fast method of determining the visibility of all objects in a scene.

Detail elision is the practice of displaying an object at a varying level of detail (LOD) depending on the object's importance to the perceived complexity of the scene. This perceived importance has traditionally been measured by the size of the object in screen picture elements (pixels). The key to using detail elision is to have several levels of detail available for all complex objects in the scene.

It is also desirable in computer generated displays of complex structure such as aircraft, to provide the user with the ability to turn selected objects on or off. Thus, for example, a designer who is principally interested in the ducting throughout the aircraft can selectively turn ducting on, and most or all other structure off, to thereby clearly view the ducting design.

It is also desirable, where a computer generated graphics display is less than the full detail of all parts, to attempt to recreate colors representing those parts. Thus, when a designer is moving throughout a complex structure and viewing representations of detailed parts, the colors as viewed in those representations should reflect those of the detailed parts, to thereby give the user a sense of realism.

There is a long felt need in the interactive computer graphic display art, therefore, to provide a user controlled display of movement (i.e., animation) through a complex structure which gives the user a true sense of movement through a three-dimensional object, while minimizing requirements for computer memory and speed.

SUMMARY OF THE INVENTION

It is an object of the present invention, therefore, to provide a method for controlling the level of detail presented to a user in an interactive, user controlled display system such that, without, the use of excessive memory or computing speed, the user is given a sense of movement throughout a three dimensional object.

It is a particular object of the invention to provide the above-described improved method which may be used to allow interactive user controlled displays of a complex structure, such as an aircraft, to identify structural interferences, allow for the routing of items such as ducts and wiring throughout crowded areas, facilitate integrated product teams by allowing joint work with a "live" model and reduce cycle time and cost for the production of illustrations and training media.

It is yet a further object of the invention to provide the above method with the additional ability to allow a user to turn selected parts on or off, to thereby enhance visualization of selected objects.

It is yet a further object of the invention to provide the above method with a coloring technique to color level of detail volumes in a way that represents the parts contained therein.

Briefly, in accordance with the invention, a method for controlling the level of detail displayed in a computer generated screen display of a complex structure is provided wherein the structure is modeled as a root volume bounding all of the parts of the structure, with the individual parts comprising sub-objects bounded in sub-volumes. The method comprises the steps of:

a) selecting the root volume;
b) determining whether any portion of the root volume falls within the viewing frustum of the screen and:
   i) if it does not, culling all of said parts,
   ii) if it does, proceeding with step c);
c) determining the screen size of said bounding volume if displayed;
d) comparing the screen size with a predetermined threshold value and, if the screen size is less than a predetermined threshold value, displaying the bounding volume, otherwise proceeding with step e);

e) determining if there are sub-volumes to the bounding volume if displayed and if not, displaying the detailed part, otherwise proceeding with step f);

f) repeating steps b) through e) above for each sub-volume, to thereby determine the level of detailed display therefore.

In a further aspect of the invention, the above method is included within a system which permits the user to controllably move the screen display about the structure, with the predetermined threshold being set at a first value corresponding to less level of detail during such movement and at a second value corresponding to an enhanced level of detail in the absence of user directed movement.

In yet a further aspect of the invention, the above described improved method is included within a system which permits the display setting of selected objects to be turned on or off, with the method further comprising the steps of:

for each volume being processed for level of detail to display:

i) determining if the display setting of each sub-volume is turned off and, if so, culling the volume, otherwise ii) determining if the display setting of each sub-volume is turned on and, if so, proceeding to determine level of detail display per steps a) through e), otherwise, iii) determining if the display setting of at least one sub-volume is on, and at least one sub-volume is off and permitting said volume to be culled in accordance with steps b) through f), but prohibiting said volume from being displayed as level of detail pursuant to steps b) through f).

In yet a further aspect of the invention, the method as described above includes the method of coloring each level of detail bounding volume and comprises the steps of:

i) determining the color of each sub-volume of said bounding volume, ii) predeterminedly weighting each sub-volume color, and iii) summing all weighted sub-volume colors, to thereby produce the color of said level of detail bounding volume.

The invention further includes a method for determining the color of level of detail bounding volumes in a computer generated screen display of a complex structure, wherein the structure is modeled as a root volume bounding all of the parts of the structure, with the individual parts comprising sub-objects bounded in sub-volumes. The method comprises the steps of:

a) calculating the ratio of each sub-volume within a parent volume to said parent volume;

b) weighting the color of each sub-volume by said ratio raised to a predetermined power; and c) adding all of the sub-volume weighted colors within a parent volume to determine the screen displayed color thereof.

In yet a further aspect of the method for determining the color of level of detailed bounding volumes described above, the predetermined power for weighting the color of each sub-volume is selected as two-thirds.

BRIEF DESCRIPTION OF THE DRAWINGS

FIGS. 3A–3C are side, isometric views of the complex structure shown in FIG. 1 and further depicts the creation of computer generated bounding volumes;

FIGS. 4A–4C illustrate an extremely complex mechanical assembly and depict the varying levels of detail provided in the computer model therefore;

DETAILED DESCRIPTION

The present invention is directed to a method for controlling the level of detail displayed in a computer generated screen display of a complex structure. The present invention assumes that some level of detail modeling has been provided, which level of detail modeling is not the subject of the present invention. The preferred method for generating the level of detail modeling is set forth in copending patent application Ser. No. 08/329,356 filed Oct. 26, 1994 entitled Method for Creating Spatially Balanced Bounding Volume Hierarchies for Use In a Computer Generated Display of a Complex Structure, invented by Eric L. Brechner and Virgil E. Bouressa and assigned to the same assignee of as the present invention, which is incorporated herein by the present reference. A fundamental understanding of a method for creating a bounding volume hierarchy is set forth herein in FIGS. 1 through 4, but it should be understood that a more complete description of the preferred method is set forth in the afore-referenced application.

Figure 1:
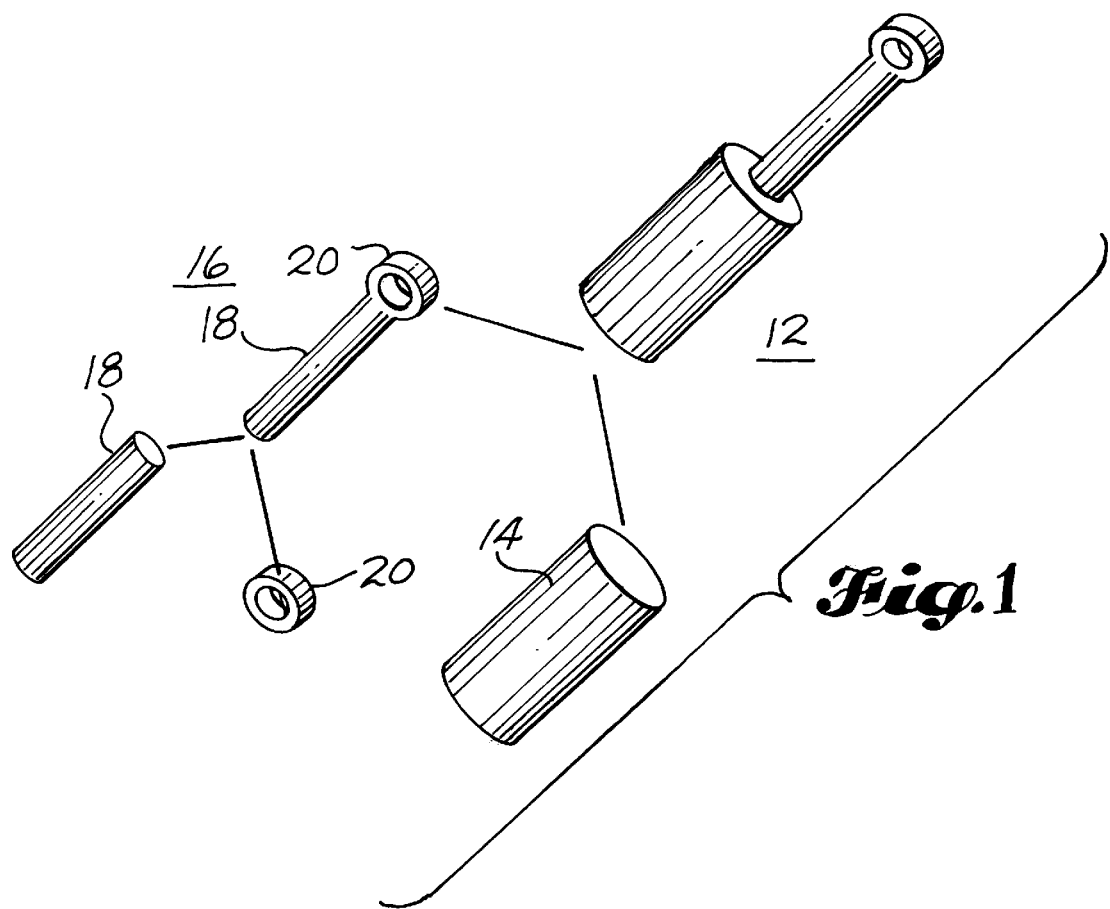
FIG. 1 is an isometric view of an arbitrary complex structure and depicts the manner by which the structure is broken into its detailed parts for purposes of computer modeling.
Figure 2:
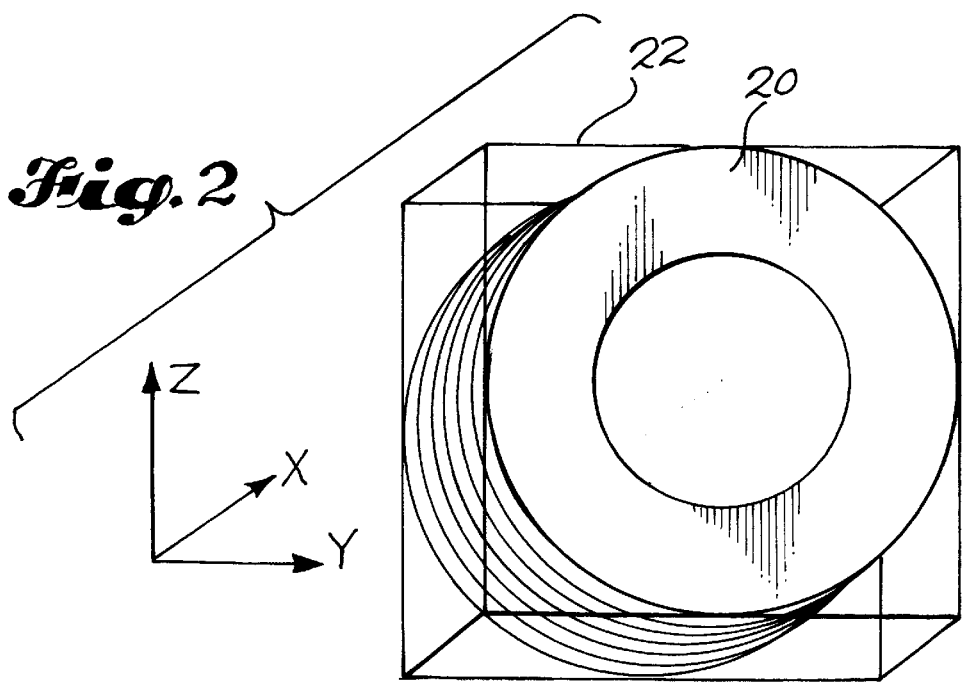
FIG. 2 is an isometric view of one of the component parts of the complex structure in FIG. 1 and illustrates the manner by which a bounding volume for the part is generated.

FIG. 1 illustrates a method whereby a computer generated graphic representation of a complex structure can be broken down into its component parts and then, as is shown in FIGS. 2, 3, and 4, modeled as bounding volumes. Shown in FIG. 1 is a perspective view of an arbitrary, complex structure, here indicated generally at 12. This overall structure 12 may exist in digital format, as a data set which may be generated by any of several well-known CAD/CAM programs. (In the preferred embodiment of the invention, the data sets were generated by a CAD/CAM program known at CATIA, which is available under license from Dessault.)

The modeling continues to break down the complex structure, 12 from its all encompassing or root level to its branch levels including the cylinder 14 and an assembly, indicated generally at 16, including a shaft 18 which is connected to a cylindrical end connector 20. The assembly 16 is then broken down via further branches into its component parts of the shaft 18 and cylindrical end connector 20. Thus, depicted in FIG. 1 is an inverted tree structure, with the basic root containing all of the parts of the complex structure at the top which is further broken down into various branches containing sub-assemblies and, ultimately, the detailed parts themselves as the leaves.

To provide level of detail for the complex structure, the root, branch and leaf levels are further modeled using bounding volumes, as shown in FIG. 2. Here, the cylindrical end connector 20 is modeled via its bounding volume comprised of the eight cornered box 22. This eight cornered box is stored by the computer as a quick model for the cylindrical end connector 20. Less computer memory is required to store the box 22 than is required for storage of the complete cylindrical end connector 20. As such, in applications wherein the user can interactively move throughout a complex structure, thereby requiring high demands on computer speed and memory, it might be acceptable to display the bounding box volume 22 in place of the detailed cylindrical end connector 20 itself.

In fact, as is shown in FIGS. 3A–3C, bounding volumes are created for the entire complex structure 12. Thus, referring to FIG. 3A shown is a box type bounding volume 34 for cylinder 14, a box type bounding volume 38, for connecting shaft 18 and the afore-described bounding volume 22 for the cylindrical end connector 20.

Further levels of detail with respect to the bounding volumes are possible. Note that in FIG. 1, a sub assembly 16 is comprised of cylindrical end connector 20 connected to shaft 18. Thus, in FIG. 3B a branch bounding volume 42 is formed about the sub-assembly 16.

Finally, in FIG. 3C a yet further bounding volume 44 is formed about the entire structure 12. Thus, at the lowest level of detail, the bounding volume 44 may be displayed, whereas in the highest level of detail prior to depiction of the actual part 12 itself, the bounding volumes 22, 38, and 34 may be displayed.

Figure 4A:
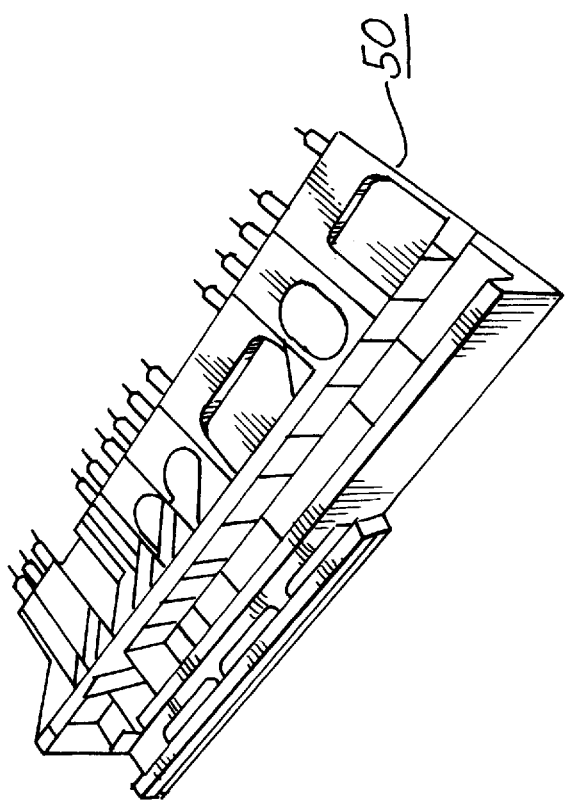
Figure 4C:
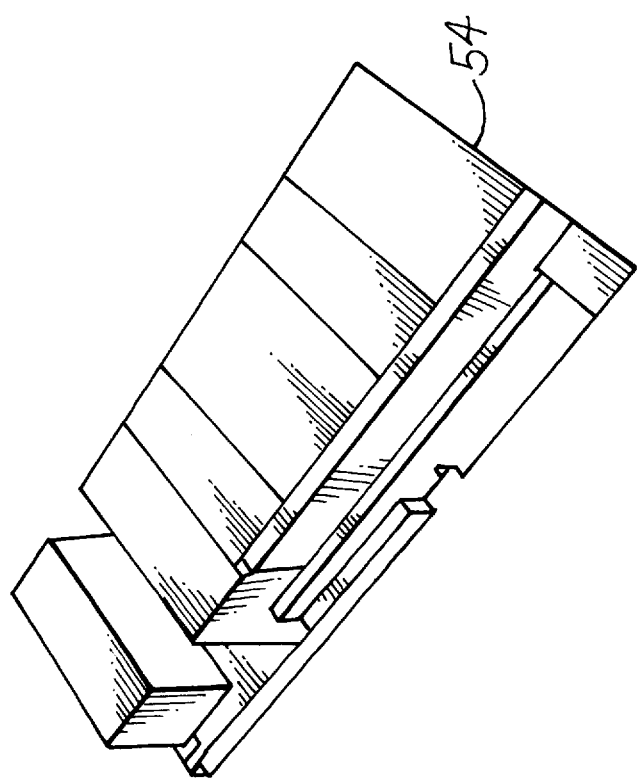

The depiction of level of detail display for a highly complex assembly is set forth in FIGS. 4A–4C.

FIG. 4A illustrates a highly complex assembly 50 comprised of numerous, individual parts. Here, the assembly is depicted at the part-level (i.e., highest level of detail). If the user were to select a lower level of detail, now resorting to the first level of boundary volumes, the resultant display of FIG. 4B would be shown. Here, the complex structure 50 has been modeled by various bounding volumes as shown in the display 52. Note that to an interactive user who is moving throughout an overall structure, the display 52 definitely suggests the detailed part and, yet, by the use of bounding volumes, far less computer speed and or computer memory is required to depict the graphic display 52.

Finally, as shown in FIG. 4C, a yet lower level of detail display 54 may be user selected. Here, while the general outline of the part is depicted, individual structure is not discernible. The display 54 is, therefore, even less demanding on computer speed and memory.

Figure 5:
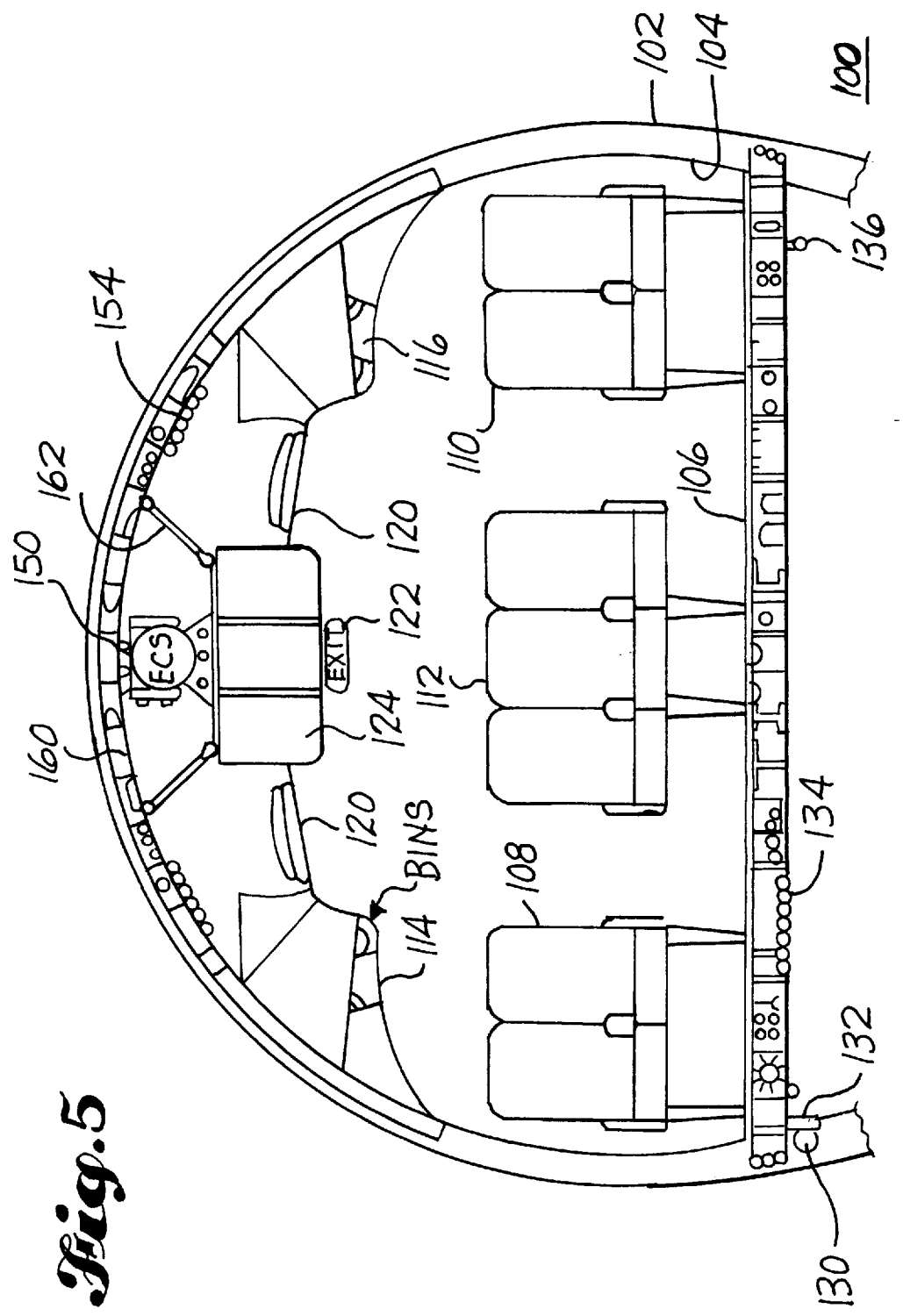
FIG. 5 is a cross-sectional view of an aircraft structure and illustrates numerous components that a user may select to turn on or off in the computer generated depiction thereof.

FIG. 5 is a cross-sectional view of a commercial aircraft, indicated generally at 100, and illustrates a practical application for use of the present invention. The aircraft's structure 100 is comprised of a generally circular outer skin 102 and an interior side wall 104. Inside the structure is the horizontal floor 106 shown supporting two side seat pairs 108, 110 and a central seating triple 112. Overhead of the side seat pairs 108, 110 are storage bins 114, 116, respectively. Overhead of the central seating triple 112 is ceiling structure 120, an electrical sign 122 and a storage bin 124.

Numerous structures are routed beneath the floor 106. This includes, for illustrative purposes, a potable water line 130, which is supported by a water line support bracket 132. Also provided are electrical lines 134, which provide power throughout the aircraft, and a waste duct 136.

Routed above the ceiling 120 and storage bins 124 is a duct containing flight control lines 150, a series of electrical wire bundles 152, 154 and galley overhead ties and brackets 160, 162. While countless other structure is included within a typical aircraft cross-section, the highly complex nature of the overall structure 100 is apparent.

The present invention finds application in an interactive visualization of the aircraft structure 100 wherein, sitting at a workstation, an operator can select to change his or her perspective and move throughout the aircraft. Due to the high number of detailed parts in an aircraft structure, and to the effects of culling and detail elision described above, the demands for computer speed and memory to depict all of the aircraft's structure within the viewing frustum are extraordinary. As such, it is desirable to reduce or model parts (such as via the level of detail described with respect to FIGS. 1 through 4) to allow a user to get a genuine sense of movement throughout the aircraft and yet be within reasonable constraints of computer speed and memory.

Also, it is desirable that a user at the workstation be allowed to turn on or off certain selected objects to thereby give a clearer view of the structure of interest. For example, an engineer who wishes to focus strictly on the electrical wiring bundles 134, 152, and 154 in the aircraft, can selectively turn off the displays of the water lines 130, 136. On the other hand, if a designer is interested only in possible interference problems between the water lines 130, 136 and the floor mounted wire bundle 134, all other structure can be turned off and the user can interactively move throughout the aircraft to make sure that no such interferences exist.

Figure 6:
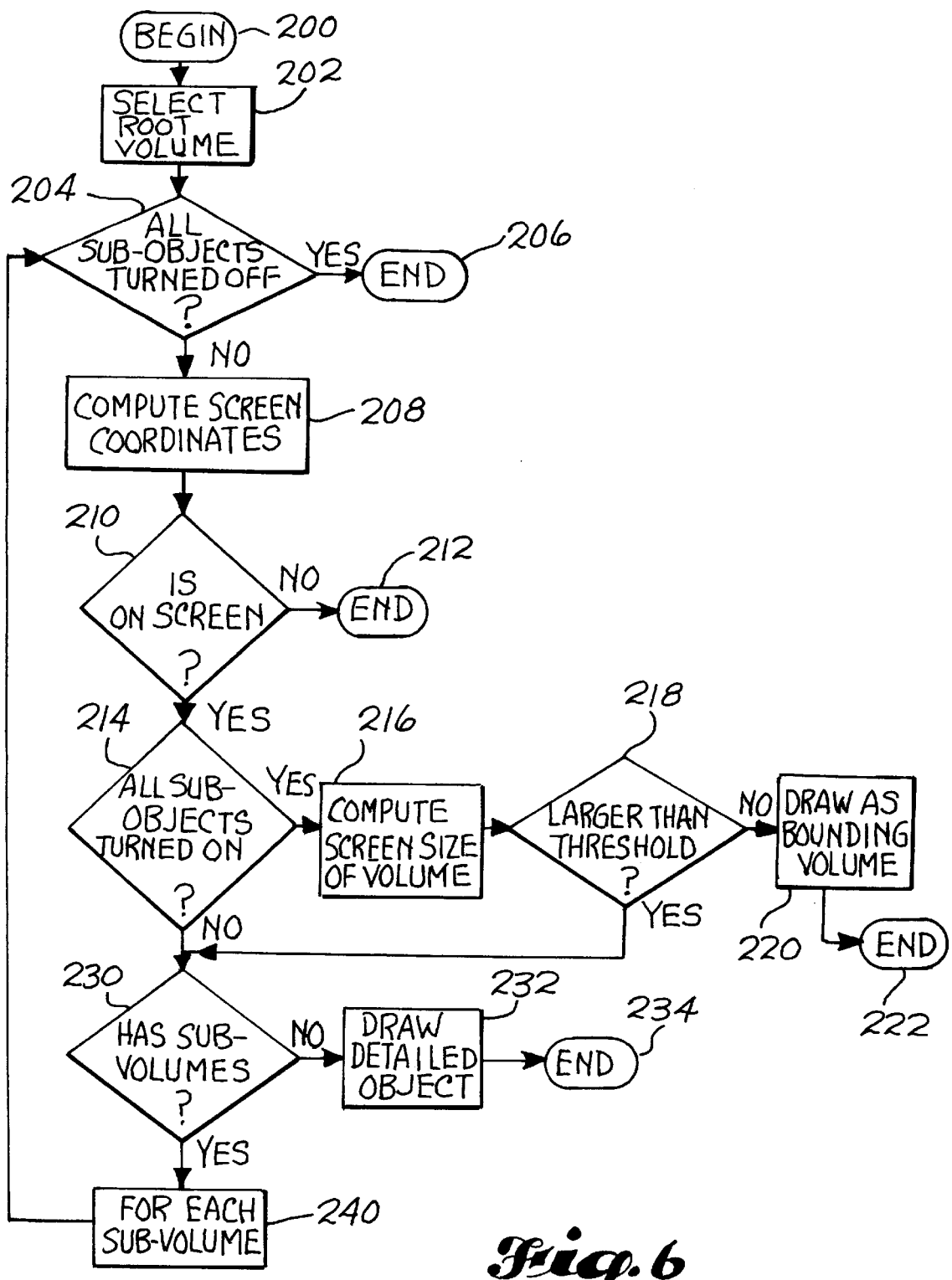
FIG. 6 is a detailed logic flow diagram of the preferred method for controlling level of detail being displayed and further depicts the process by which a user may selectively turn objects on or off in accordance with the present invention.

FIG. 6 is a detailed logic flow diagram illustrating the preferred method for controlling the level of detail displayed in a computer generated screen display of a complex structure. It is herein assumed, as described above, that the structure is modeled as a root volume bounding all of the parts of the structure, with individual parts comprising sub-objects bounded in sub-volumes.

The method begins at instruction 200. First, the root volume, i.e., the entire collection of all parts, such as all parts modeled within an entire aircraft, is selected at 202. A test is then made at 204 to determine whether or not all sub-objects of the root volume have been turned off. If the answer to this question is yes, this means that nothing is to be displayed and the method hits end instruction 206, with the entire volume being culled.

If all sub-objects are not turned off, the method at 208 calculates the screen coordinates for the selected volume. Where the bounding volume is chosen as boxes, step 208 determines the screen coordinates of all eight corners of the bounding box.

At step 210, a decision is made as to whether or not the computed screen coordinates are on the screen or off the screen. This is done by comparing all eight corner extents of the selected volume to the extents of the corners of the screen. If there is no overlap, none of the selected object is on the screen and the system then ends at 212, with the entire collection of parts being culled.

However, if some portion of the selected volume overlaps the screen extent, step 214 is entered and it is determined whether or not all sub-objects within the selected volume are turned on. If all sub-objects are turned on, step 216 is entered and the screen size of the selected volume, should it be displayed, is computed. This is accomplished in the preferred embodiment by clipping the selected volume screen extents to the boundaries of the screen and computing the resulting area thereof. In a typical rastered display comprised of picture elements (pixels), the screen size of the selected volume would typically be determined as the number of pixels. The system then determines at step 218 whether or not the computed screen size of the selected volume is greater or less than a predetermined threshold. The threshold, (as depicted in varying levels with respect to FIGS. 4A–4C) may be user selected to provide a higher or lower level of detail. In addition, a lower level of detail will be provided if the user elects to move throughout the complex structure (via animation) to thereby conserve computer memory.

If, at step 218, it is determined that the screen size of the selected bounding volume is smaller than the predetermined threshold, the system proceeds at step 220 to draw the bounding volume as the desired level of detail. The system then enters the end mode 222 since the appropriate level of detail has been determined.

If, however, the computed screen size of the selected volume is determined to be larger than the threshold in step 218, step 230 is entered and a determination is made as to whether the selected volume has sub-volumes. Step 230 is also entered if, at step 214, it is determined that not all sub-objects are turned on.

If, at step 230, it is determined that there are no sub-volumes, step 232 is entered and the detailed object is drawn, with the processing then ending at 234. If, however, there are sub-volumes of the selected volume, step 240 is entered and, for each such sub-volume, the process initiates back to step 204.

The process thus continues as described above for each sub-volume until a desired level of detail display for the entire structure has been determined.

In this way, a fast and efficient method for determining desired level of detail display for a computer generated graphic of a complex structure may be determined.

Figure 7A:
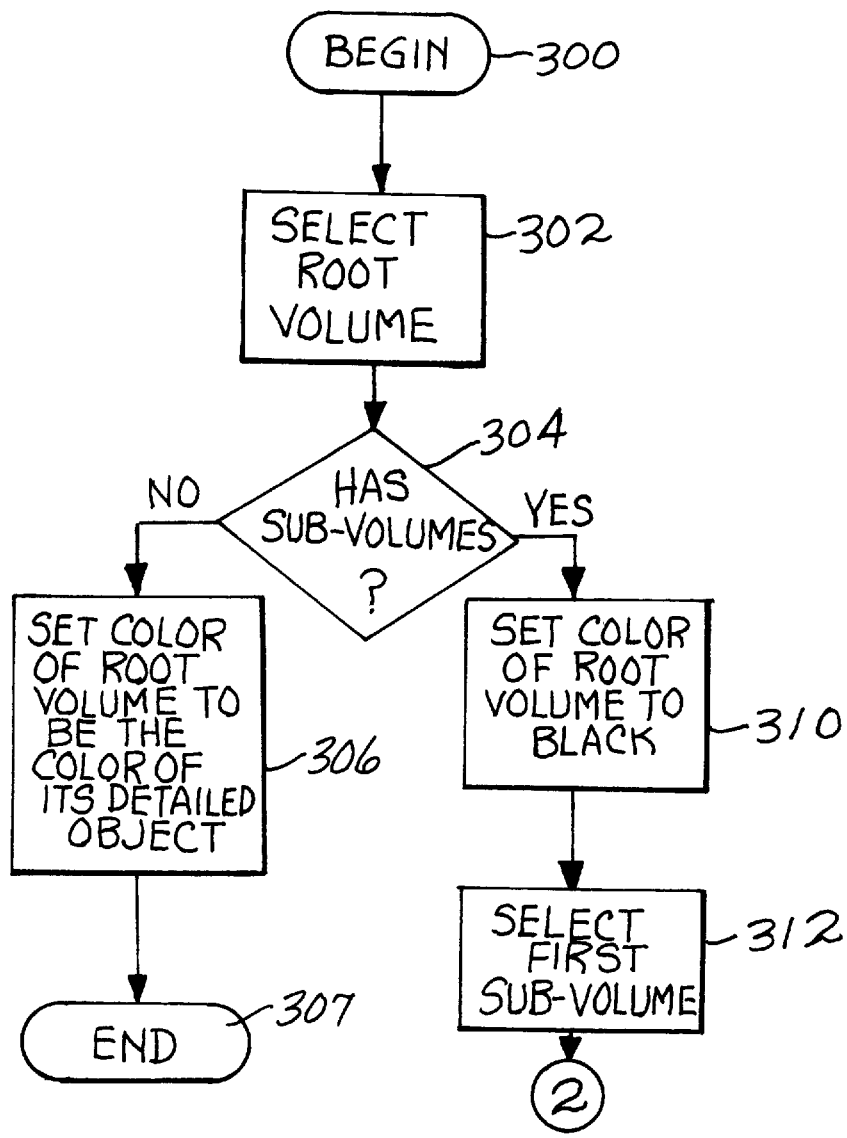
FIGS. 7A, 7B are detailed logic flow diagrams illustrating the preferred method for coloring the level of detail being displayed.
Figure 7B:
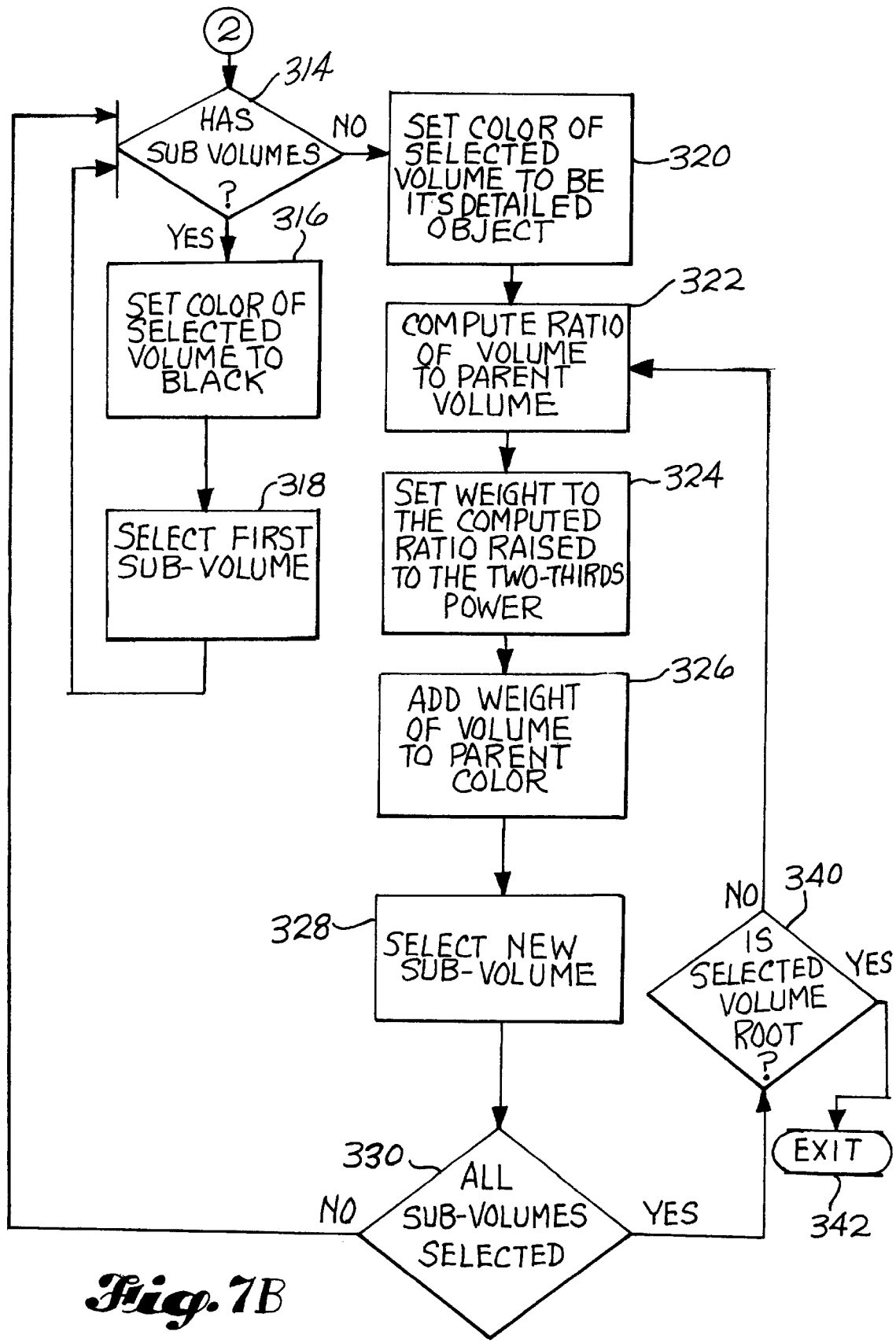

FIGS. 7A and 7B are detailed logic flow diagrams which depict the manner by which each level of detail within a complex structure may be colored. With respect to a computer model of a complex structure, such as an aircraft, the method as set forth in the logic flow diagram of FIG. 7 will go through all levels of detail which could be depicted and determine the appropriate color to be displayed for each bounding volume at each possible level of detail. These values are then stored in the computer and called forth when the desired level of detail of a given bounding volume is to be displayed.

The coloring method begins at 300. First, the root volume (i.e., the bounding volume containing all objects) is selected at step 302. A test is made at step 304 to determine whether or not the selected root volume has sub-volumes. If it does not, step 306 is entered and the color of the root volume is set to be the color of its detailed object. The system then enters the end mode at 307 since the color for each level of detail has been defined.

If, however, at step 304 it is determined that the root volume has sub-volumes, step 310 is entered. At step 310 the color of the root volume is set to a predetermined initial value which, for RGB monitors in a typical raster display is black. This predetermined initial color is the absence of all color for the selected display system. In step 312, the first sub-volume of the root volume is selected. At step 314, a determination is made as to whether or not that first selected sub- volume has sub-volumes. If the selected volume has sub-volumes, step 316 is entered and the color of the selected volume is also set to its predetermined initial value, here, black. Then, step 318 is entered and the system selects the first sub-volume. It then returns to step 314 to determine whether or not that sub-volume has any sub-volumes. In this way, the process is recursive to deal with all sub-volumes.

The above process repeats until, at step 314, it is determined that there are no further sub-volumes. In this case, the color of the selected volume is set to be that of its detailed object in step 320. Following this, the ratio of the selected volume to its parent volume is calculated at step 322. The system then enters step 324 wherein the weight of the computed ratio from step 322 is raised to the $\frac{2}{3}$'s power. Then, at step 326 the weighted color of the selected volume is algebraically added to the parent volume's color.

The system then continues at step 328 to select a new volume and at step 330 to ask whether or not all volumes have been selected. If they have not, the selected new volume is passed back through step 314 to determine whether or not the selected sub-volume has sub-volumes, and so forth.

If, at step 330, all sub-volumes have been selected, step 340 is entered where it is determined whether or not all sub-volumes contained within the root volume have been selected. If they have, then the colors for all possible levels of detail within the complex structure have been determined and the system exits to step 342. If, however, more sub-volumes have to be processed, step 322 is entered and the system recursively repeats.

The approach behind the detailed logic flow diagram of FIG. 7 is that the color of a bounding volume drawn for a given level of detail may be represented by the emitters of the colors it contains. For volumes which contain sub-volumes, the color of the volume is first assigned to the intensity of light passing through it, (e.g. black for an RGB display). To compute the color of the volume, the algebraic sum of the colors of all of the sub-volumes weighted by the ratio of the sub-volumes volume to the parent's volume raised to the $\frac{2}{3}$ power is used. This approximates an inverse square fall off of intensity of the sub-volume's color to the parent volume with pleasing results.

In summary, a method for controlling the level of detail displayed in a computer generated screen display of a complex structure wherein the structure is modeled as a root volume bounding all of the parts of the structure, with the individual parts comprising sub-objects bounded in sub-volumes has been described in detail. Further, a method allowing the selective turning on or off of objects has been shown. In addition a preferred method for coloring all levels of detail within the root volume and sub-volumes has also been described.

Whereas a preferred embodiment of the invention has been described in detail, it should be apparent that many modifications and variations thereto are possible, all within the true spirit and scope of the invention.

For example, although the preferred embodiment depicts a particular methodology for the bounding volume modeling of a complex structure, namely, boxing, it should be apparent that the inventive method described and claimed herein is adapted for use with numerous other such methodologies.

I claim:

1. A method for controlling the level of detail displayed in a computer generated screen display of a complex structure wherein said structure is modeled as a root volume bounding all of the detailed parts of said structure, with the individual parts comprising sub-objects bounded in sub-volumes, said method comprising the steps of:

a) selecting the root volume;
   b) determining whether any portion of said selected volume falls within the viewing frustum of the screen and:
      i) if no portion of said selected volume falls within the viewing frustum of the screen culling all of said parts, ii) if any portion of said selected volume does fall within the viewing frustum of the screen proceeding with step c);

c) determining the screen size of said selected bounding volume;

d) comparing said screen size with a predetermined threshold value and, if said screen size is less than said predetermined threshold value, displaying the selected bounding volume, otherwise proceeding with step e);

e) determining if there are sub-volumes to said selected bounding volume if displayed and if there are no sub-volumes to said selected bounding volume, displaying the detailed part, otherwise proceeding with step f), f) repeating steps b) through e) above for each sub-volume, to thereby determine the level of detail displayed therefore.

2. The method of claim 1 wherein the step of determining whether any portion of said selected volume falls within the viewing frustum of the screen comprises the step of:

determining the screen extents of the corners of the selected volume and if there is no overlap between the screen extents of the selected volume and the corners of the screen, culling all of said parts, otherwise proceeding with step c).

3. The method of claim 2 wherein the step of determining the screen size of the selected bounding volume if displayed comprises the step of clipping said selected volume screen extents to the boundaries of the screen and computing the resulting area thereof.

4. The method of claim 1 wherein said predetermined threshold is user controlled.

5. The method of claim 1 wherein said predetermined threshold is set as a predetermined number of screen pixels.

6. The method of claim 1 included within a system permitting a user to controllably move the view displayed on the screen about said structure, and wherein said predetermined threshold is set at a first value corresponding to less level of detail during such movement and at a second value corresponding to enhanced level of detail in the absence of user directed movement.

7. The method of claim 6 wherein said first and second predetermined threshold values are user controlled.

8. The method of claim 6 wherein said first and second predetermined threshold values are set as a predetermined number of screen pixels.

9. The method of claim 1 included within a system permitting the display setting of selected objects to be turned on or off, the method further comprising the steps of:

for each volume being processed for level of detail display:

i) determining if the display setting of each sub-volume is turned off and, if so, culling the volume, otherwise ii) determining if the display setting of each sub-volume is turned on and, if so, proceeding to determine level of detail display per steps b) through f), otherwise iii) determining if the display setting of at least one sub-volume is on and at least one sub-volume is off and permitting said volume to be culled in accordance with steps b) through f), but prohibiting said volume from being displayed as level of detail pursuant to steps b) through f).

10. The method of claim 1 including the method of coloring each level of detail bounding volume comprising the steps of:

i) determining the color of each sub-volume of said bounding volume, ii) predeterminedly weighting each sub-volume color, and iii) summing all weighted sub-volume colors, to thereby produce the color of said level of detail bounding volume.

11. The method of claim 10 wherein the step of predeterminedly weighting each sub-volume color includes the steps of:

a) determining the ratio of the volume of each sub-volume to its parent volume, and b) weighting each sub-volume color by said ratio raised to the two-thirds power.

12. The method of claim 11 wherein step of summing all weighted sub-volumes includes the step of taking the algebraic sum of all weighted sub-volume colors.

13. The method of claim 10 wherein the step of summing all weighted sub-volumes includes the step of taking the algebraic sum of all weighted sub-volume colors.

14. A method for determining the color of level of detail bounding volumes in a computer generated screen display of a complex structure, wherein said structure is modeled as a root volume bounding all of the detailed parts of said structure, with the one or more individual parts comprising zero to many sub-objects bounded in zero to many corresponding sub-volumes, said method comprising the steps of:

a) selecting the root volume;

b) determining whether the root volume has sub-volumes and:

i) if it does not, setting the color of the root volume to be the same as the color of its detailed part, ii) if it does, proceeding with step c);

c) setting the color of the root volume to a predetermined initial color;

d) selecting a first sub-volume of said root volume;

e) determining if the selected sub-volume has sub-volumes and:

i) if it does:

1) setting the color of the selected sub-volume to a predetermined initial color, 2) selecting a first sub-volume, and 3) repeating step e) for said selected sub-volume, ii) if it does not:

1) setting the color of the selected sub-volume to a predetermined initial color, 2) weighting said color in accordance with a predetermined weighting function, 3) adding said weighted color to the color of the parent's volume, 4) selecting a new sub-volume, 5) determining if all sub-volumes have been selected:

if so, continuing per step e) ii) 2) above, and if not continuing per step e) above whereby each bounding volume is colored to reflect the colors of volumes it contains.

15. The method of claim 14 wherein the step of weighting said color in accordance with a predetermined weighting function comprises the steps of:

computing the ratio of a selected volume to that of its parent volume, and weighting the color of the sub-volume by said ratio raised to the two-thirds power.

16. The method of claim 14 wherein said computer screen is an RGB monitor and wherein said predetermined initial color is selected to be black.

17. A method for determining the color of level of detail bounding volumes in a computer generated screen display of a complex structure, wherein said structure is modeled as a root volume bounding all of the parts of said structure, with the individual parts comprising sub-objects bounded in sub-volumes, said method comprising the steps of:

a) calculating the ratio of each sub-volume within a parent volume to said parent volume;

b) weighting the color of each sub-volume by said ratio raised to a predetermined power; and c) adding all of the sub-volume weighted colors within a parent volume to determine the screen displayed color thereof.

18. The method of claim 17 wherein said predetermined power for weighting the color of each sub-volume is two thirds.

* * * * *